United States Patent
Hinz et al.

(10) Patent No.: US 12,270,942 B2
(45) Date of Patent: Apr. 8, 2025

(54) FLEXIBLE SENSOR STRIP, METHOD OF MANUFACTURING A FLEXIBLE SENSOR STRIP, USE OF A FLEXIBLE SENSOR STRIP AND MOTOR VEHICLE HAVING A FLEXIBLE SENSOR STRIP

(71) Applicant: Webasto SE, Stockdorf (DE)

(72) Inventors: Alexander Hinz, Stockdorf (DE); Moritz Pradella, Stockdorf (DE)

(73) Assignee: Webasto SE, Stockdorf (DE)

( * ) Notice: Subject to any disclaimer, the term of this patent is extended or adjusted under 35 U.S.C. 154(b) by 9 days.

(21) Appl. No.: 18/271,297

(22) PCT Filed: Dec. 27, 2021

(86) PCT No.: PCT/EP2021/087694
§ 371 (c)(1),
(2) Date: Jul. 7, 2023

(87) PCT Pub. No.: WO2022/148687
PCT Pub. Date: Jul. 14, 2022

(65) Prior Publication Data
US 2024/0069164 A1    Feb. 29, 2024

(30) Foreign Application Priority Data
Jan. 8, 2021   (DE) .......................... 102021100192.7

(51) Int. Cl.
*G01S 7/481*        (2006.01)
*G01S 7/02*         (2006.01)
(Continued)

(52) U.S. Cl.
CPC ............ *G01S 7/4813* (2013.01); *G01S 7/027* (2021.05); *G01S 7/521* (2013.01); *G01S 13/862* (2013.01);
(Continued)

(58) Field of Classification Search
CPC ........ G01S 7/4813; G01S 7/027; G01S 7/521; G01S 17/931; G01S 17/86; G01S 13/862;
(Continued)

(56) References Cited

U.S. PATENT DOCUMENTS

2010/0220046 A1*   9/2010   Plotz ................. G02F 1/133603
                                                           362/249.02
2018/0149329 A1    5/2018   Tan et al.
2020/0003374 A1    1/2020   Bommel et al.

FOREIGN PATENT DOCUMENTS

CN        202561541 U       11/2012
DE        102006002782 A1    8/2007
(Continued)

*Primary Examiner* — Anne M Hines
(74) *Attorney, Agent, or Firm* — Command IP LLP; Michael Zarrabian

(57) ABSTRACT

The present invention relates to a flexible sensor strip for a motor vehicle, in particular for a tailgate, a movable roof element or a convertible top of a motor vehicle, the flexible sensor strip including: a first continuous portion; a second portion, which is at least partially electrically connected to the first continuous portion, and comprises alternately arranged recesses and mounting portions; where the first continuous portion and the second portion are arranged at an angle to each other.

17 Claims, 6 Drawing Sheets

Figure 1:
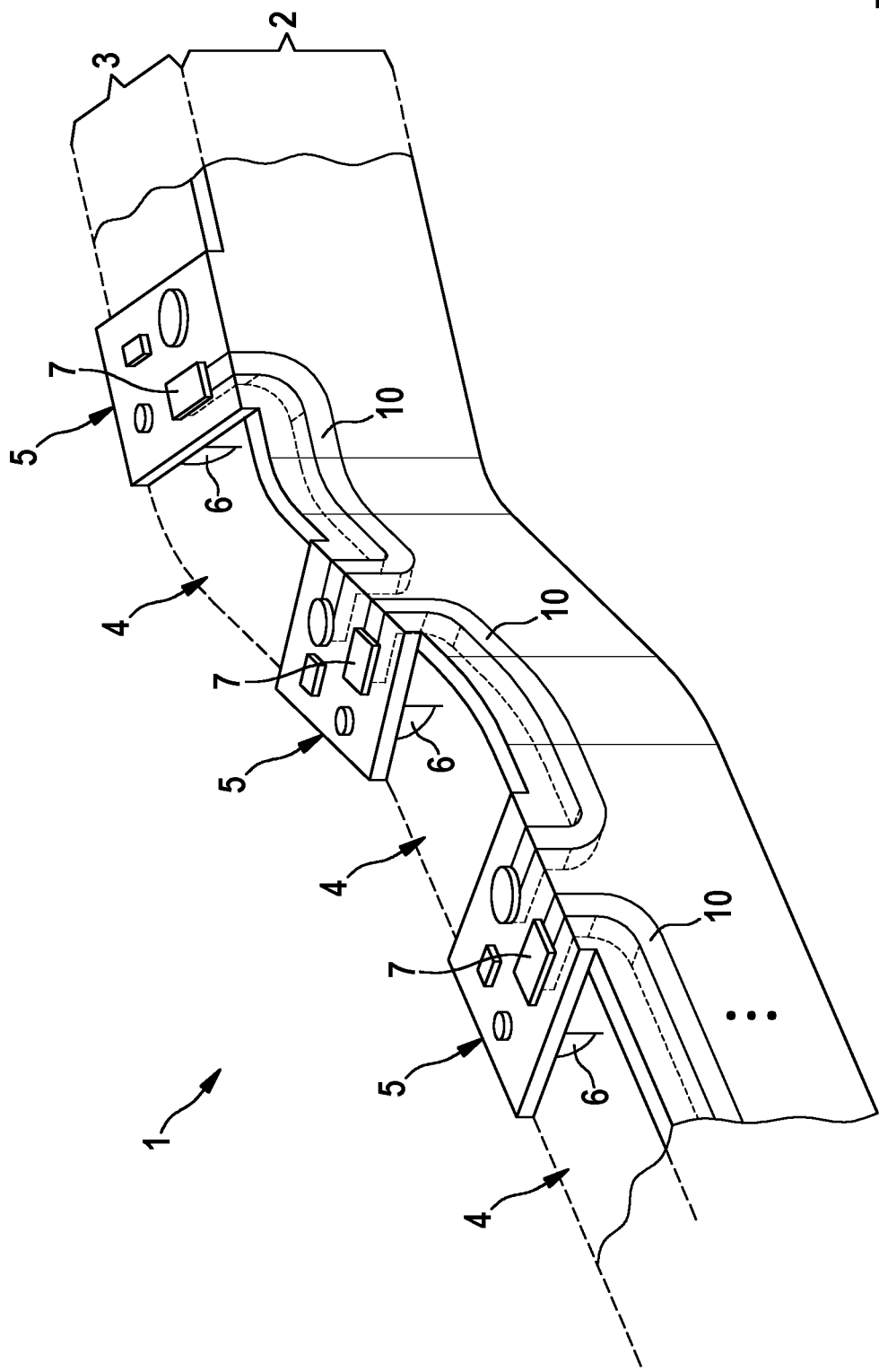

(51) Int. Cl.
  *G01S 7/521* (2006.01)
  *G01S 13/86* (2006.01)
  *G01S 17/86* (2020.01)
  *G01S 17/931* (2020.01)
  *G01S 13/931* (2020.01)

(52) U.S. Cl.
  CPC ............ *G01S 13/865* (2013.01); *G01S 17/86* (2020.01); *G01S 17/931* (2020.01); *G01S 2013/93272* (2020.01); *G01S 2013/93273* (2020.01)

(58) Field of Classification Search
  CPC ......... G01S 13/865; G01S 2013/93272; G01S 2013/93273
  See application file for complete search history.

(56) References Cited

FOREIGN PATENT DOCUMENTS

| | | |
|---|---|---|
| DE | 102006053572 | 7/2008 |
| EP | 3305040 A1 | 4/2018 |

* cited by examiner

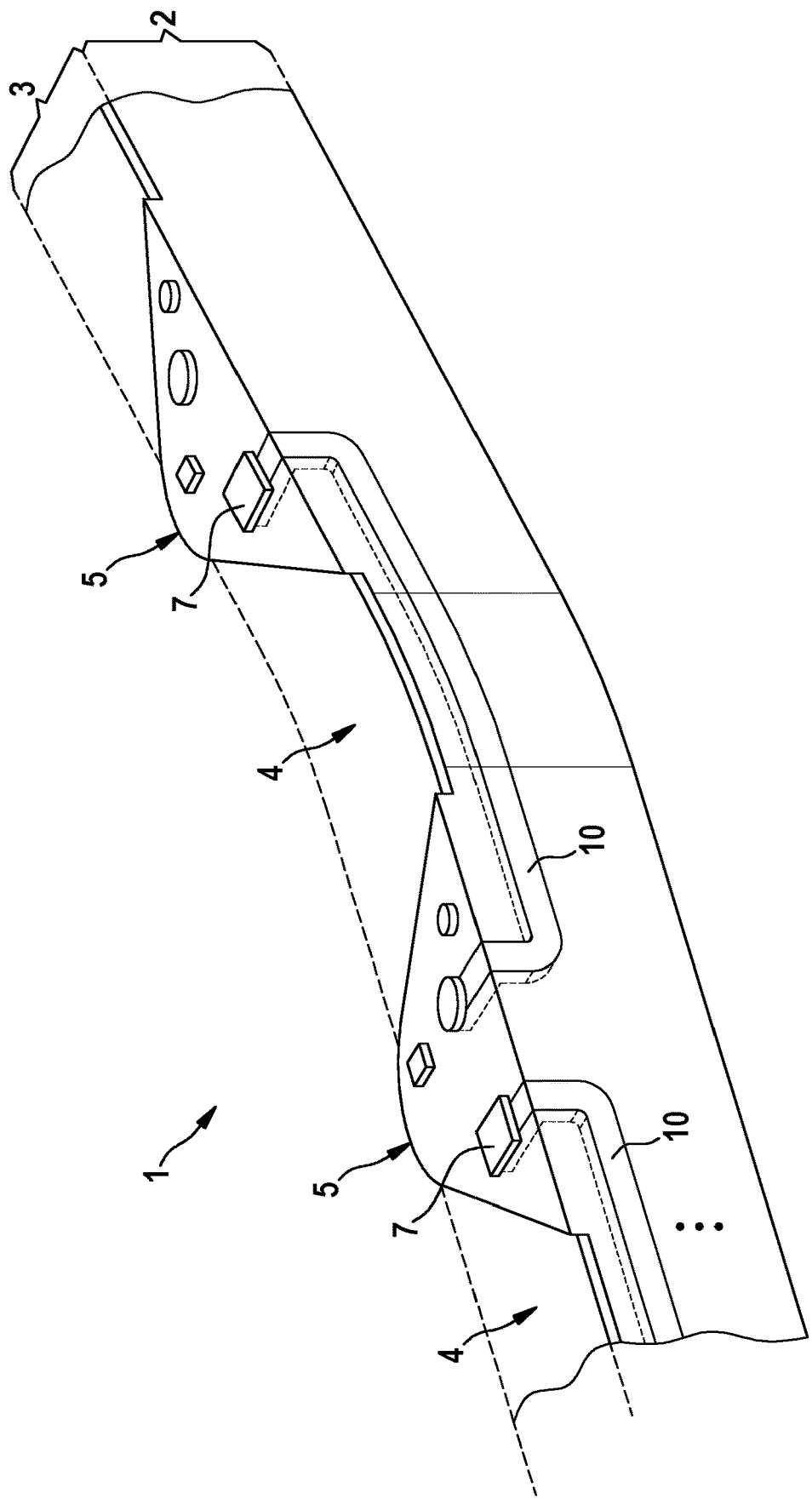

FLEXIBLE SENSOR STRIP, METHOD OF MANUFACTURING A FLEXIBLE SENSOR STRIP, USE OF A FLEXIBLE SENSOR STRIP AND MOTOR VEHICLE HAVING A FLEXIBLE SENSOR STRIP

CROSS-REFERENCE TO RELATED APPLICATIONS

This application is a 35 U.S.C. § 371 National Stage Entry of International Application No. PCT/EP2021/087694 filed Dec. 27, 2021, which claims the priority benefit of German Patent Application Serial Number DE 10 2021 100 192.7 filed Jan. 8, 2021, all of which are incorporated herein by reference in their entirety for all purposes.

DESCRIPTION

The invention relates to a flexible sensor strip, a method of manufacturing a flexible sensor strip, a use of a flexible sensor strip, and a motor vehicle having a flexible sensor strip.

Rigid or 2D-flexible sensor strips are known from prior art for various fields of application. In the known sensor strips, the electronic components are arranged on a 2D-flexible conductor, a so-called flex circuit board. Although such an arrangement allows narrow bending radii, these are insufficient for certain fields of application in a motor vehicle, such as on tailgates, movable roof elements, or convertible tops. To solve this problem, the prior art proposes to divide the sensor strip into pieces. In this case, the sensor strip is cut into smaller sensor strips and laid around curves with connecting lines. One problem that arises here, however, is that the entire area to be monitored cannot be covered by the sensors due to such fragmentation.

Prior art document DE 10 2006 002 782 A1 discloses a sensor arrangement on a bumper of a motor vehicle with a sensor band, wherein the sensor band is arranged behind the outer wall of the bumper in the transverse direction of the vehicle and has at least one sensor which is connected via a line to a device which may, for example, detect an impact of a pedestrian on the bumper and activate a protective device which damps and/or cushions the impact of the object, and the sensor band being held by a retaining strip and being elastically biased against an inner wall of the bumper, at least over a larger portion in the transverse direction of the vehicle, by an intermediate part made of an elastomer or rubber, between the retaining strip and the sensor band.

The current prior art has the disadvantage that it is not possible to flexibly arrange the sensor strip parallel to the spatially freely arranged surfaces. This leads to an insufficient coverage of the corresponding area by the sensor technology. In addition, the costs and the installation efforts are high due to the necessary partitioning of the sensor strip. Moreover, continuous protection of the sensors of the sensor strip, as achieved in the prior art, for example, by overmolding with a polyurethane foam, is only possible with a high level of technical effort.

It is therefore the object of the present invention to provide a flexible sensor strip that eliminates or at least minimizes the disadvantages known from prior art. In particular, it is an object of the present invention to enable a flexible arrangement of the sensor strip parallel to the spatially freely arranged surfaces.

According to the invention, this object is solved by a flexible sensor strip according to claim 1. Accordingly, a flexible sensor strip for a motor vehicle, in particular for a tailgate, a movable roof element or a convertible top of a motor vehicle, is provided, wherein the flexible sensor strip includes the following: a first continuous portion, a second portion which is at least partially electrically connected to the first continuous portion, and which comprises alternately arranged recesses and mounting portions, wherein the first continuous portion and the second portion are arranged at an angle with respect to each other.

The flexible sensor strip according to the invention provides an advantage that by arranging the first continuous portion and the second portion at an angle with respect to each other, a flexible arrangement of the sensor strip parallel to the spatially freely arranged surfaces is possible. In addition, such a flexible arrangement eliminates the need for a partitioned and separated arrangement, and the entire area to be monitored may be covered by the sensors. In addition, both the costs and the installation effort of the sensor strip are reduced, since the partitioning required in prior art is not necessary. In particular, it is possible for the flexible sensor strip to be manufactured from a single piece. Continuous protection of the sensors of the sensor strip, as achieved in the prior art, for example, by overmolding with a polyurethane foam, is now easier and less expensive to implement.

Preferably, the angle between the first continuous portion and the second portion is 10° to 170°, in particular 30° to 150°, or 50° to 130°, or 70° to 110°, or 80° to 100°, preferably 90°. In addition to the advantages mentioned with respect to claim 1, such a choice of the angle between the first continuous portion and the second portion makes it possible to arrange the sensor strip parallel to the spatially freely arranged surfaces in an even more flexible manner.

From a functional point of view, it has proven advantageous if the recesses and/or mounting portion of the second portions are at least partially rectangular or square in plan view. In this way, despite the flexibility of the sensor strip, a stable and easy-to-manufacture shape of the recesses and/or mounting portions is achieved.

Advantageously, the recesses and/or respective of the second portion include a waveform, at least in part, when viewed from above. In a first variant, the waveform has a continuous periodic shape, for example a sine, rectangular, triangular and sawtooth shape. An advantage of this continuous periodic shape is that the flexible sensor strip is easy to manufacture and flexible to use. In a second embodiment, the waveform has a non-continuous and non-periodic shape, for example, a shape in which the distances between the recesses and mounting portion are different in each case. An advantage of this non-continuous and non-periodic shape is that the flexible sensor strip can be individually adapted to the respective field of application. A general advantage of the waveform is that, despite the flexibility of the sensor strip, a stable and easy-to-manufacture shape of the recesses and/or mounting portions is achieved. In particular, the wave form makes it possible for the recesses and the mounting portions to be manufactured from a single piece using a single tool.

In a further advantageous embodiment, the mounting portions of the second portion and/or one or more end faces of the continuous first portion are mounted with sensors, in particular IR-LEDs, radar sensors, ultrasonic sensors, laser sensors, Lidar-sensors, and/or multisensors. This makes it possible for sensors known from prior art, with their respective advantages, to be combined with the flexible sensor strip according to the invention. In particular, it is possible to cover the entire area to be monitored with sensors.

Preferably, the sensors are arranged on a surface of the mounting portions of the second portion and/or one or more end faces of the continuous first portion and/or in the mounting portions of the second portion and/or in the end faces of the continuous first area. By this, the sensors can be arranged individually according to the field of application or assembly space, respectively. In particular, this also makes it possible to cover the entire area to be monitored with sensors over a large area.

From a functional point of view, it has proven advantageous if the first continuous portion and the second portion are connected by means of electrical conductors. This provides a safe and flexible sensor strip that can be adapted to the respective requirements.

Advantageously, the mounting portions of the second portion at least partially include stabilization cores. The use of stabilization cores increases the mechanical load capacity of the mounting portions depending on the desired field of application.

In a further advantageous embodiment, the stabilization cores include a potting material, in particular a flexible PU-foam core. By using a potting material, the mechanical load capacity of the mounting portions can be further increased.

The object is also solved by a method for manufacturing a flexible sensor strip according to one of the preceding embodiments, the method comprising the following method steps: defining a first continuous portion and a second portion of a flexible sensor strip, wherein the second portion is at least partially electrically connected to the first continuous portion, removing material of the flexible sensor strip in the second portion so that recesses and mounting portions are alternately arranged, and arranging the first continuous portion and the second portion at an angle with respect to each other.

The advantages of the flexible sensor strip are achieved by the method according to the invention. In particular, the arrangement of the first continuous portion and the second portion at an angle with respect to each other makes it possible to flexibly arrange the sensor strip parallel to the spatially freely arranged surfaces. Furthermore, such a flexible arrangement can avoid fragmentation and the entire area to be monitored can be covered by the sensors. In addition, both the costs and the installation effort of the sensor strip are reduced, since the partitioned and divided arrangement required in the prior art is no longer necessary. In particular, it is possible to manufacture the flexible sensor strip from a single piece. There is also no need for the time-consuming connection of small individual printed circuit boards, as is necessary in the prior art.

Preferably, the angle between the first continuous portion and the second portion is 10° to 170°, in particular 30° to 150°, or 50° to 130°, or 70° to 110°, or 80° to 100°, preferably 90°. In addition to the advantages mentioned above, such a choice of the angle between the first continuous portion and the second portion makes it possible to arrange the sensor strip parallel to the spatially freely arranged surfaces even more flexibly.

Advantageously, the flexible sensor strip is manufactured from one piece of a flex circuit board made of foil material. This reduces the manufacturing costs and also the assembly costs of the flexible sensor strip.

In a further advantageous embodiment, the removal of material of the flexible sensor strip in the second portion is performed by a punching process, whereby the recesses and/or mounting portions of the second portion are at least partially rectangular or square. This automatable step achieves a large manufacturing volume with regard to the flexible sensor strip. Also, the rectangular or square shape of the recess ensures that the flexible sensor strip can be adapted to a wide variety of contours. For example, a rectangular or square shape of the mounting portions ensures that there is sufficient space for components on the mounting portions.

It has also proved advantageous that the removal of material from the flexible sensor strip in the second portion is carried out by a continuous cut, in particular by moving knives, as a result of which the recesses and/or mounting portions of the second portion at least partially include a wave shape. By such a process step, it is possible that the flexible sensor strip is manufactured in one cutting operation. For example, both the recesses and the mounting portions can be manufactured from the base material with one continuous cut. This leads both to a reduction in the cost of the flexible sensor strip and to easier assembly of the flexible sensor strip, as separating cuts are not necessary.

Advantageously, the mounting portions of the second portion and/or end faces of the continuous first portion are equipped with sensors, in particular IR-LEDs, radar sensors, ultrasonic sensors, laser sensors, Lidar sensors, and/or multisensors. This makes it possible for sensors known from the prior art, with their respective advantages, to be combined with the flexible sensor strip according to the invention. In particular, it is possible to cover the entire area to be monitored with sensors.

The object is also solved by using a flexible sensor strip according to one of the embodiments described in or on a motor vehicle. By using the flexible sensor strip according to the invention, the advantages of the sensor strip according to the invention are achieved.

The object is also solved by a motor vehicle with a flexible sensor strip according to one of the embodiments described. By the motor vehicle with the flexible sensor strip according to the invention, the advantages of the sensor strip according to the invention are achieved.

Figure 2:
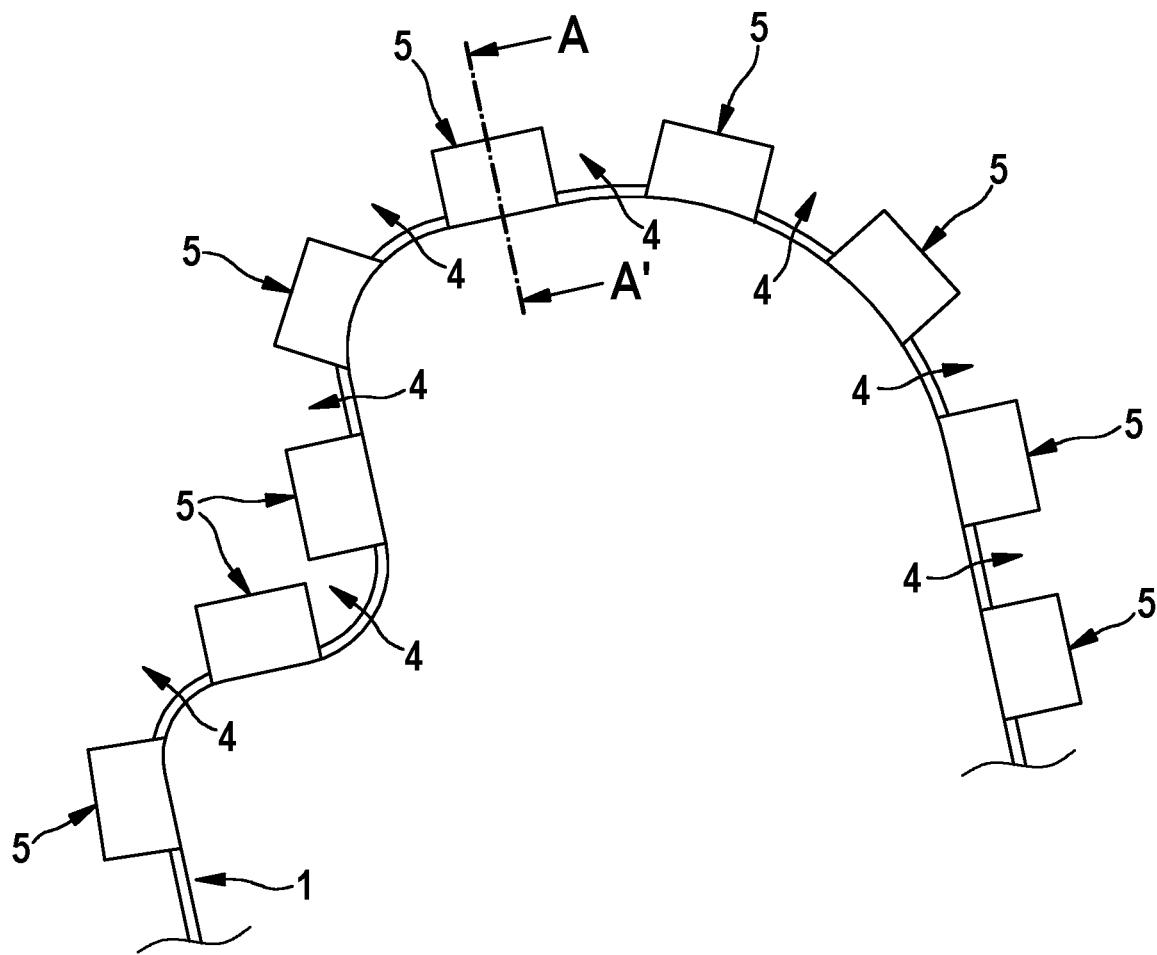
Figure 3A:
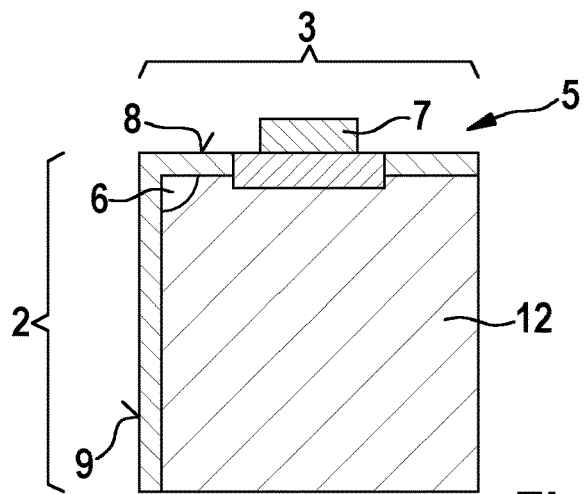
Figure 3B:
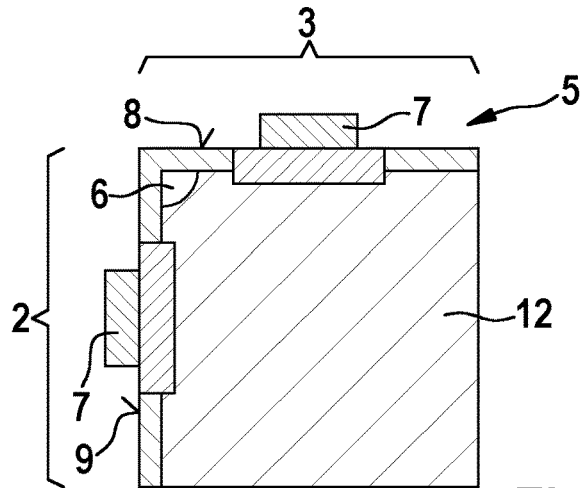
Figure 3C:
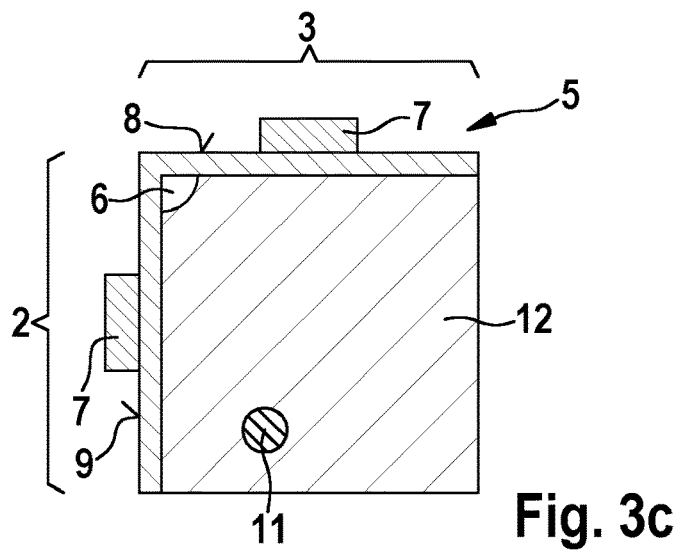
Figure 5:
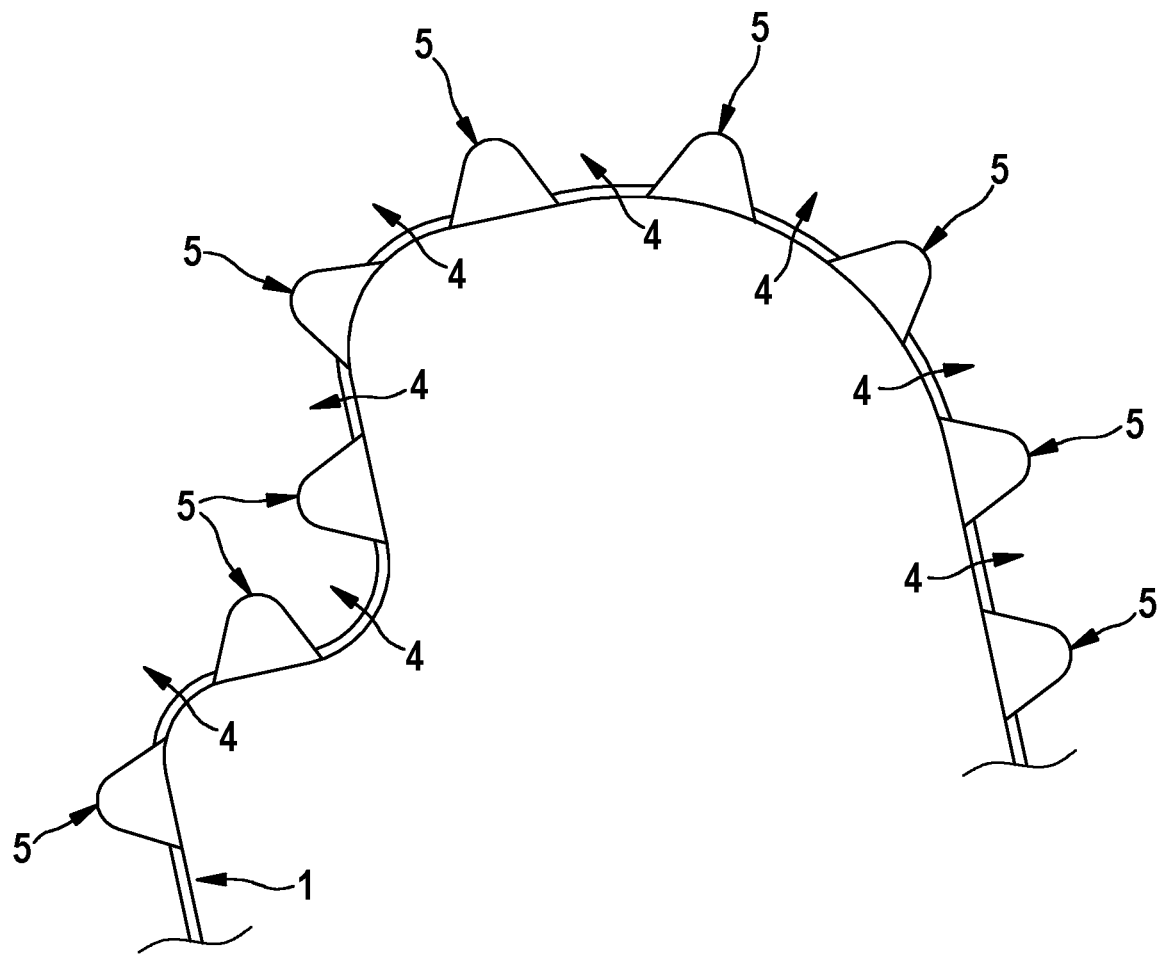
Figure 6:
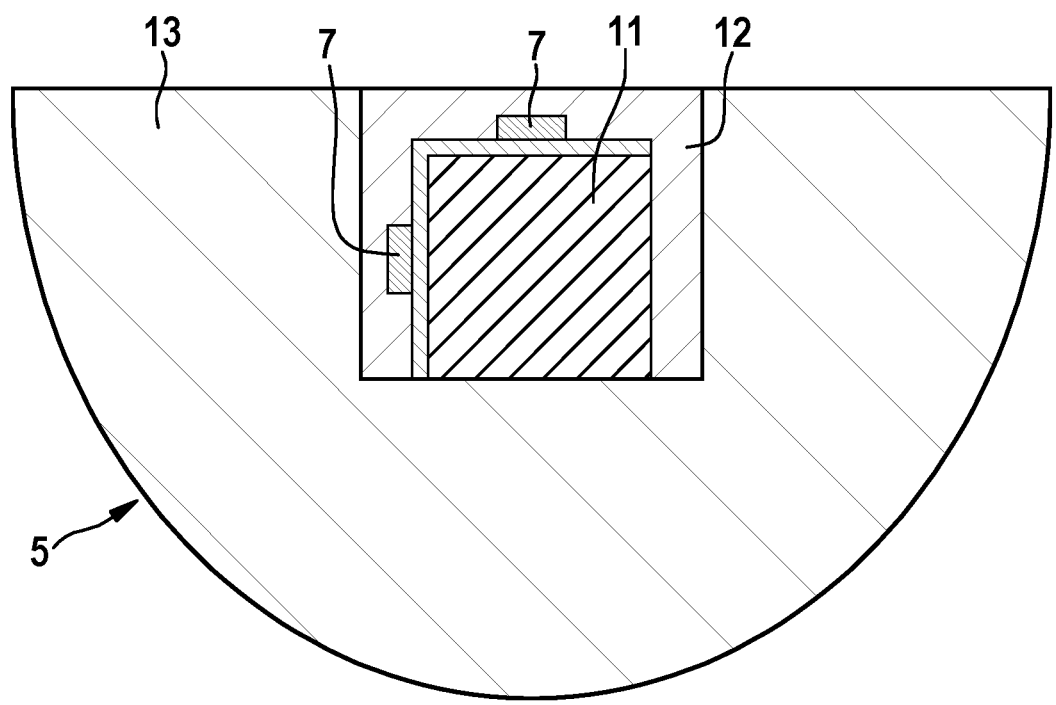

The present technology/concept has been described in detail with regard to a flexible sensor strip. However, this technology or concept could also be used alternatively or additionally as a light strip/lighting strip (with LEDs) in the vehicle, i.e. not only as a sensor strip, or pure sensor strip Further details and advantages of the invention will now be explained in more detail with reference to some preferred embodiments shown in the drawings. Therein, it is shown in:

FIG. 1 a first embodiment of a flexible sensor strip according to the invention, FIG. 2 a plan view of the first embodiment of a flexible sensor strip according to the invention, FIGS. 3a, 3b, 3c possible arrangements of the sensors on a first embodiment of the flexible sensor strip according to the invention, FIG. 4 a second embodiment of a flexible sensor strip according to the invention, FIG. 5 a plan view of the second embodiment of a flexible sensor strip according to the invention, FIG. 6 a detail view of a second embodiment of an assembly space of a flexible sensor strip according to the invention.

In particular, the invention relates to a flexible sensor strip with alternating omissions and mounting portions, wherein the mounting portions are angled at approximately 90° with respect to the remainder of the sensor strip on its upper side. This structure allows flexible bending about a main bending direction, which corresponds approximately to a direction of travel of a motor vehicle. The recesses and/or the mounting portions may be rectangular, square and/or wave-shaped.

The flexible sensor strip according to the invention makes it possible to manufacture it from a single piece, thus eliminating the need for time-consuming connection of small individual sensor strips. It is also possible to manufacture the flexible sensor strip according to the invention from flex circuit boards made of foil material. This foil material is usually provided in the form of rolls, for example with a width of about 280 mm. From this width, several individual strips of the flexible sensor strip according to the invention can be produced, for example with knives at one end of the roll in a continuous process.

The wave shape additionally enables the production of the omissions, or recesses, and the mounting portions on the strip that continuously running through, without waste and without an additional process step, such as a punching out of the rectangles or squares by movable knives at the end of the strip.

The flexible printed circuit boards produced in this way having lengths of up to 5 meters also allow continuous overmolding against environmental influences, a so-called potting of media protection, in a significantly simplified form as compared to overmolding of individual printed circuit boards with subsequent establishing of contacts.

FIG. 1 shows a first embodiment of a flexible sensor strip 1 according to the invention. The flexible sensor strip 1 has a first continuous portion 2 and a second portion 3. The second portion 3 is highlighted with dashed lines in FIG. 1. This second portion 3 is at least partially electrically connected to the first portion and comprises alternately arranged recesses 4 and mounting portions 5. The first continuous portion 2 and the second portion 3 are arranged at an angle 6 with respect to each other. The angle 6 between the first through-going portion 2 and the second portion 3 is approximately 90° in the embodiment shown in FIG. 1. However, this is difficult to see due to the perspective of FIG. 1. In the first embodiment, the recesses 4 and mounting portions 5 of the second portion 3 are rectangular. The mounting portions 5 of the second portion 3 are equipped with sensors 7, for example with IR-LEDs, radar sensors, ultrasonic sensors, laser sensors, Lidar sensors, and/or multisensors. These sensors 7 are arranged on the surface 8 of the mounting portions 5 of the second portion in the embodiment of FIG. 1. In the embodiment illustrated in FIG. 1, the first continuous portion 2 and the second portion 3 are connected by means of electrical conductors 10. It is self-evident for the person skilled in the art that instead of a rectangular configuration of the mounting portions and/or the recesses, a square, rectangular, or trapezoidal configuration is also possible. Likewise, it is self-evident for the skilled person that the distances between the mounting portions can be varied, depending on the desired field of application.

FIG. 2 shows a top view of the first embodiment of the flexible sensor strip 1 according to the invention. For reasons of clarity, only the recesses 4 and the mounting portions 5 are shown in FIG. 2. However, it goes without saying that the components described with reference to FIG. 1 are also present in the flexible sensor strip 1 of FIG. 1. From FIG. 2, the alternating arrangement of the recesses 4 and mounting portions 5 can be readily seen. It can be recognized that the flexible sensor strip 1 according to the invention may adapt to any shape.

FIGS. 3a, 3b and 3c show possible arrangements of the sensors 7 on the first embodiment of the flexible sensor strip according to the invention. FIGS. 3a, 3b and 3c are illustrations along the line of intersection A-A' as drawn in FIG. 2. FIGS. 3a, 3b and 3c respectively depict the first continuous portion 2 and the second portion 3. The angle 6 between the first continuous portion 2 and the second portion 3 is also drawn in FIGS. 3a, 3b and 3c. In the illustrated embodiment, this angle is approximately 90°. However, it is understood that this angle may be adapted to the desired application and can be selected, for example, in a range from 10° to 170°. FIGS. 3a, 3b and 3c reveal a potting material 12 which gives the flexible sensor strip additional stability.

FIG. 3a shows an embodiment in which a sensor 7 is mounted on the surface 8 of the mounting portion 5. This sensor 7 projects into the mounting portion 5 so that the sensor 7 is protected from environmental influences. FIG. 3b illustrates an embodiment in which a sensor 7 is mounted on the surface 8 of the mounting portion 5, and a second sensor 7 is mounted on the end face 9 of the first portion 2. Although not explicitly shown, it is obvious to those skilled in the art that more than two sensors 7 can also be mounted on the surface of the second portion 3 and/or on the end face 9 of the first portion 2. Even in the embodiment shown in FIG. 3b, the sensors project into the mounting portion 5, or the first portion 2, respectively, so that the sensors 7 are protected from environmental influences. FIG. 3c shows an embodiment similar to FIG. 3b, but in which the sensors do not protrude into the mounting portion 5 or the first portion 2. This can be advantageous for certain applications in which a small thickness is important. The embodiment of FIG. 3c also includes a stabilization core 11, although it is obvious to those skilled in the art that more than one stabilization core 11 may also be provided. Furthermore, one or more stabilization cores 11 may also be provided in the embodiments of FIGS. 3a and 3b.

FIG. 4 shows a second embodiment of the flexible sensor strip 1 according to the invention. The second embodiment differs from the first embodiment in particular in the design of the recesses 4 and mounting portions 5 of the second portion 3. Reference is therefore made to the description of the first embodiment and only the differences between the second and first embodiments are set out below. In the second embodiment, the recesses 4 and the mounting portions 5 of the second portion 3 have a wave shape. This waveform makes it possible for the recesses 4 and the mounting portions 5 to be manufactured in one step using one tool. Of course, it is also possible that only the recesses 4 or only the mounting portions 5 of the second portion 3 have a waveform. However, this case is not depicted in FIG. 4.

FIG. 5 shows a top or plan view of the second embodiment of the flexible sensor strip 1 according to the invention. For reasons of clarity, only the recesses 4 and the mounting portions 5 are shown in FIG. 5. However, it is understood that the components described with respect to FIGS. 4 and 1 are also present in the flexible sensor strip 1 of FIG. 5. From FIG. 5, the waveform of the recesses 4 and mounting portions 5 can be readily seen. It can be recognized that the flexible sensor strip 1 according to the invention may adapt to any shape and is made from one piece.

FIG. 6 shows a detailed view of the second embodiment of the mounting portion 5 of the flexible sensor strip 1 according to the invention, in which the mounting portions 5 of the second portion 3 are shown in detail. These mounting portions 5 of the second portion include a total of three materials. Stabilization cores 11 are provided centrally to provide stability for the sensors 7. These stabilization cores 11 are made of PU-foam, for example. However, it goes without saying for the person skilled in the art that other suitable materials can also be used as long as they ensure stability for the sensors 7 and, if necessary, also stabilization of the mounting portion 5. Further, the mounting portion 5 of the second portion 3 has a potting material 12 into which the sensors 7 and the stabilization cores 11 are molded. The third material is a carrier material which forms the support strip 13. By using the support strip 13, expensive potting material can be saved and the potting time can be reduced. It is also possible to reduce the weight of the flexible sensor strip 1. FIG. 6 shows a mounting portion 5 of the second embodiment. However, it goes without saying that a mounting portion 5 of the first embodiment can also be provided with stabilization cores 11.

LIST OF REFERENCE SIGNS 1 flexible sensor strip
2 first continuous portion
3 second portion
4 recess
5 mounting portion
6 angle
7 sensor
8 surface
9 end face
10 electrical conductor
11 stabilization core
12 potting material
13 support strip

The invention claimed is:

1. A flexible sensor strip for a motor vehicle, the flexible sensor strip including:
   a first continuous portion comprising an end face which is equipped with at least one of a conductor or a sensor; and
   a second portion, which is at least partially electrically connected to the first continuous portion, and comprises alternately arranged recesses and mounting portions, wherein at least one of the mounting portions is equipped with at least one sensor on a surface thereof;
   wherein the end face of the first continuous portion and the surface of the mounting portion of the second portion are arranged at an angle with respect to one another.

2. The flexible sensor strip according to claim 1, wherein the angle between the first continuous portion and the second portion is 10° to 170°.

3. The flexible sensor strip according to claim 2, wherein at least one of: the recesses and mounting portions of the second portion are at least partially at least one of: rectangular in plan view and square in plan view.

4. The flexible sensor strip according to claim 2, wherein at least one of: the recesses and mounting portions of the second portion at least partially have a wave shape in plan view.

5. The flexible sensor strip according to claim 2, wherein the sensors comprise one or more of: IR-LEDs, radar sensors, ultrasonic sensors, laser sensors, Lidar sensors, and multisensors.

6. The flexible sensor strip according to claim 5, wherein the sensors are arranged on at least one of: a surface of the mounting portions of the second portion, one or more end faces of the continuous first portion, in the mounting portions of the second portion, and in the end faces of the continuous first portion.

7. The flexible sensor strip according to claim 6, wherein the first continuous portion and the second portion are connected by means of electrical conductors.

8. The flexible sensor strip according to claim 7, wherein the mounting portions of the second portion at least partially comprise stabilization cores.

9. The flexible sensor strip according to claim 8, wherein the stabilization cores have a potting material.

10. The flexible sensor strip according to claim 9, wherein the potting material is a PU foam core.

11. The flexible sensor strip for a motor vehicle of claim 1, wherein the flexible sensor strip is configured to be installed in at least one of: a tailgate, a movable roof element, and a convertible top of a motor vehicle.

12. A method for manufacturing a flexible sensor strip comprising:
   defining a first continuous portion comprising an end face and a second portion of a flexible sensor strip, the second portion being at least partially electrically connected to the first continuous portion;
   removing material of the flexible sensor strip in the second portion so that recesses and mounting portions having a surface are arranged alternately;
   arranging the end face of the first continuous portion and the surface second portion at an angle with respect to one another;
   equipping the surface of the mounting portions with at least one sensor; and
   equipping the end face of the first continuous portion with at least one of a conductor or a sensor.

13. The method according to claim 12, wherein the angle between the first continuous portion and the second portion is 10° to 170°.

14. The method according to claim 13, wherein the flexible sensor strip is made from a piece of a flex circuit board of foil material.

15. The method according to claim 14, wherein the removal of material of the flexible sensor strip in the second portion is carried out by punching, whereby at least one of: the recesses and mounting portions of the second portion are at least one of: at least partially rectangular in plan view and at least partially square in plan view.

16. The method according to claim 14, wherein the removal of material of the flexible sensor strip in the second portion is carried out by a continuous cut, in particular by movable knives, as a result of which at least one of: the recesses and mounting portions of the second portion at least partially include a wave shape in plan view.

17. The method according to claim 16, wherein at least one of: mounting portions of the second portion and end faces of the continuous first portion are equipped with sensors, wherein the sensors comprise one or more of: IR-LEDs, radar sensors, ultrasonic sensors, laser sensors, Lidar sensors, and multisensors.

* * * * *